Jan. 22, 1924.
A. H. SWEET
1,481,760
BRAKE BAND
Filed April 30, 1923
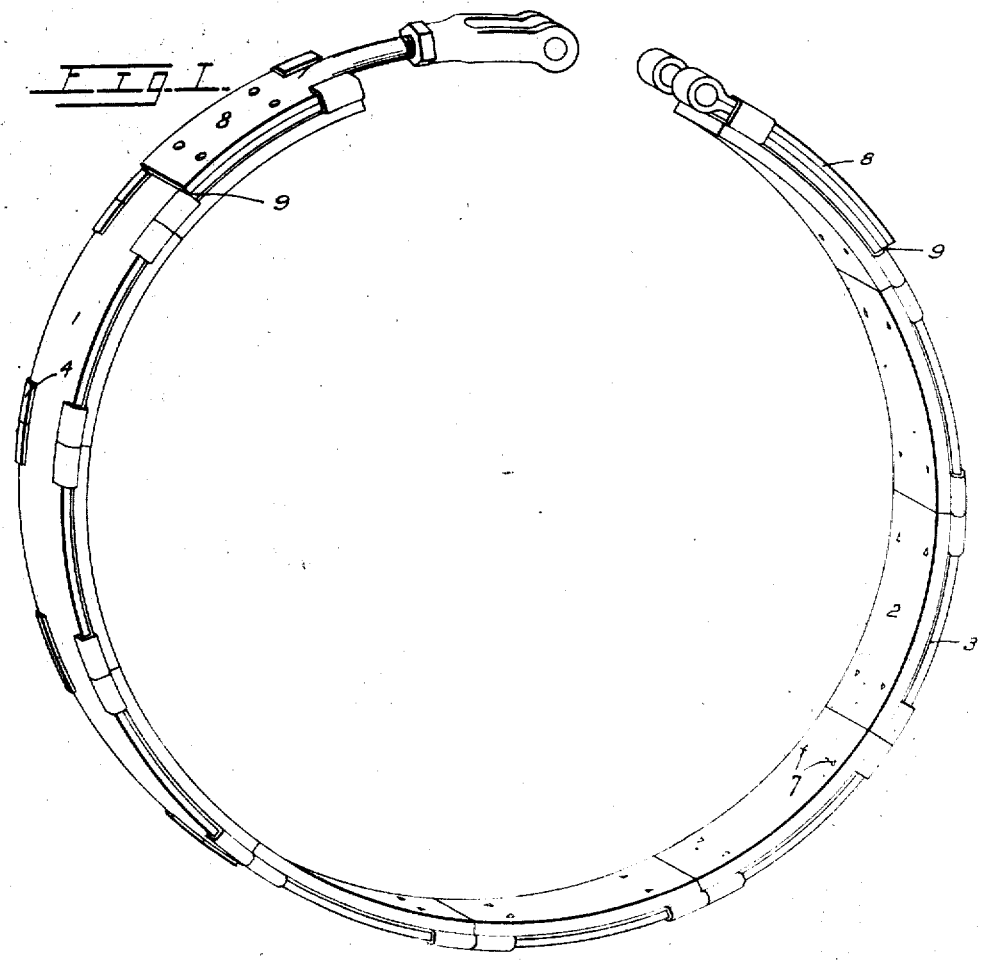
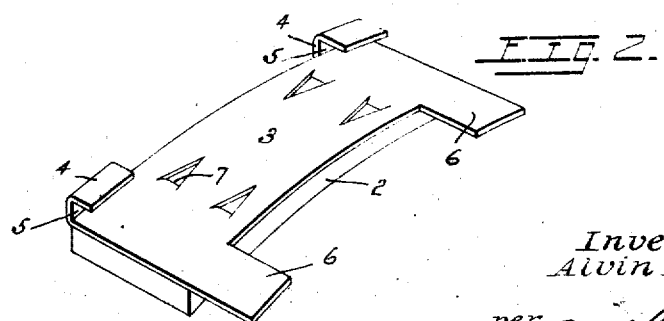
Inventor;
Alvin H. Sweet,
per N. W. Crandall
Attorney.

Patented Jan. 22, 1924.

1,481,766

UNITED STATES PATENT OFFICE.

ALVIN H. SWEET, OF LOS ANGELES, CALIFORNIA, ASSIGNOR, BY DIRECT AND MESNE ASSIGNMENTS, TO TITLE GUARANTEE AND TRUST COMPANY, TRUSTEE, OF LOS ANGELES, CALIFORNIA.

BRAKE BAND

Application filed April 30, 1923. Serial No. 635,553.

*To all whom it may concern:*

Be it known that I, ALVIN H. SWEET, a citizen of the United States, residing at Los Angeles, in the county of Los Angeles and State of California, have invented a new and useful Brake Band, of which the following is a specification.

My invention relates to improvements in brake bands and particularly when they are housed or relatively inaccessible for relining. The objects of my improvement are, first to provide a sectional lining that may be removed from or applied to a brake band without disassembling or removing it from its normal position; and, second, to afford facilities for renewing only a portion of the lining, and for arranging portions according to their relative condition of wear.

Other objects and advantages will appear hereinafter, and while I show herewith and will describe a preferred form of construction, I desire to be understood that I do not limit myself to such preferred form, but that various changes and adaptations may be made therein without departing from the spirit of my invention as hereinafter claimed.

These objects are attained by the construction illustrated in the accompanying drawing, in which—

Figure 1 is a perspective view of my improved band; and Figure 2 is a perspective view of one of the lining sections by itself.

Similar numerals refer to similar parts throughout both views.

The brake band strap 1 may be of any usual and suitable form, and the lining comprises a plurality of sections of friction material 2 with metallic backers 3. The latter are preferably made of sheet steel having, at one side, a pair of outwardly turned flanged lugs 4, so shaped as to provide channels 5 adapted for engaging the edge of the brake strap. At the opposite side the backers have a pair of flat lugs 6, adapted for being similarly bent after the sections are installed in the strap. Clinch points are pressed inwardly from the material of the backers, and the friction material is attached by means of these points, as indicated at 7.

The lining is applied by slipping the sections onto the strap transversely, with lugs 4 engaging one edge of the latter, and then bending lugs 6 around the other edge of the strap in a similar manner. Friction and the grip of the lugs on the strap will prevent circumferential movement of the sections in use, particularly if the lugs are bent so as to engage the end clips 8, as shown at 9. Worn sections of lining can be removed or placed in other positions at will, without the necessity for discarding the lining as a whole.

The construction and operation of the invention will be clear from the foregoing description. It will also be obvious that the lining is flexible and otherwise perfectly adapted for braking purposes.

In previous applications I have shown somewhat similar brake band constructions, but none of these claim what is claimed herein.

I claim;

1. A brake lining comprising a plurality of independent sections adapted for engaging one edge of a brake strap by transverse sliding and having flat lugs adapted for bending around the opposite edge of said strap.

2. A brake lining comprising a plurality of independent sections adapted for engaging one edge of a brake strap by transverse sliding and having means for retaining them in alignment with said strap.

3. A brake lining comprising a plurality of independent sections adapted for engaging one edge of a brake strap by transverse sliding and having means for retaining them in alignment with said strap and preventing circumferential motion relative thereto.

4. In combination, a brake band; a lining comprising a plurality of independent sections adapted for engaging one edge of said band by transverse sliding; and means for retaining said lining in said band.

5. In combination, a brake band; a lining comprising a plurality of independent sections adapted for engaging one edge of said band by transverse sliding; and means for retaining said lining in said band in alignment therewith and preventing circumferential motion relative thereto.

ALVIN H. SWEET.